Inventors:
Timothy B. Buell,
Harry R. Leber.

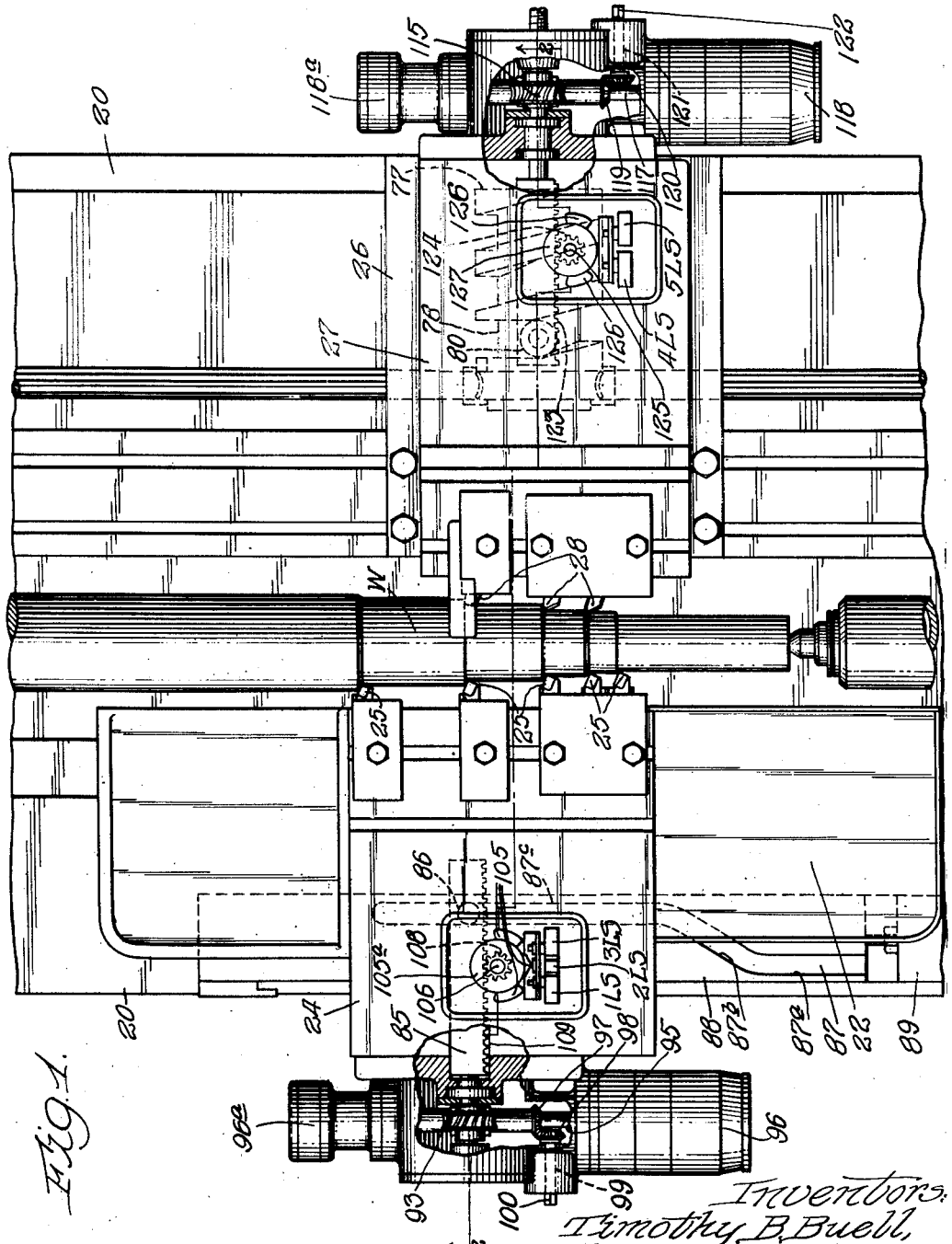

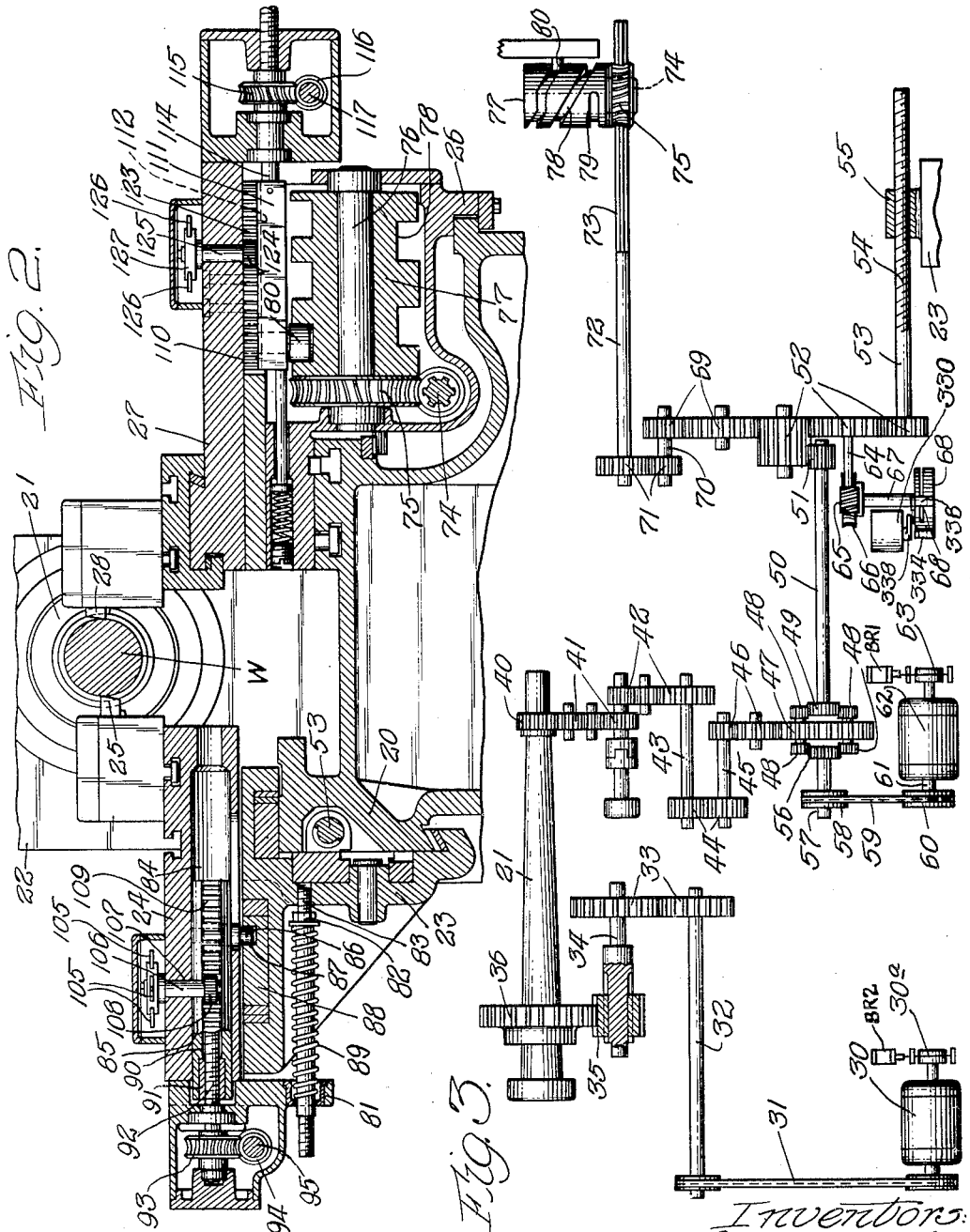

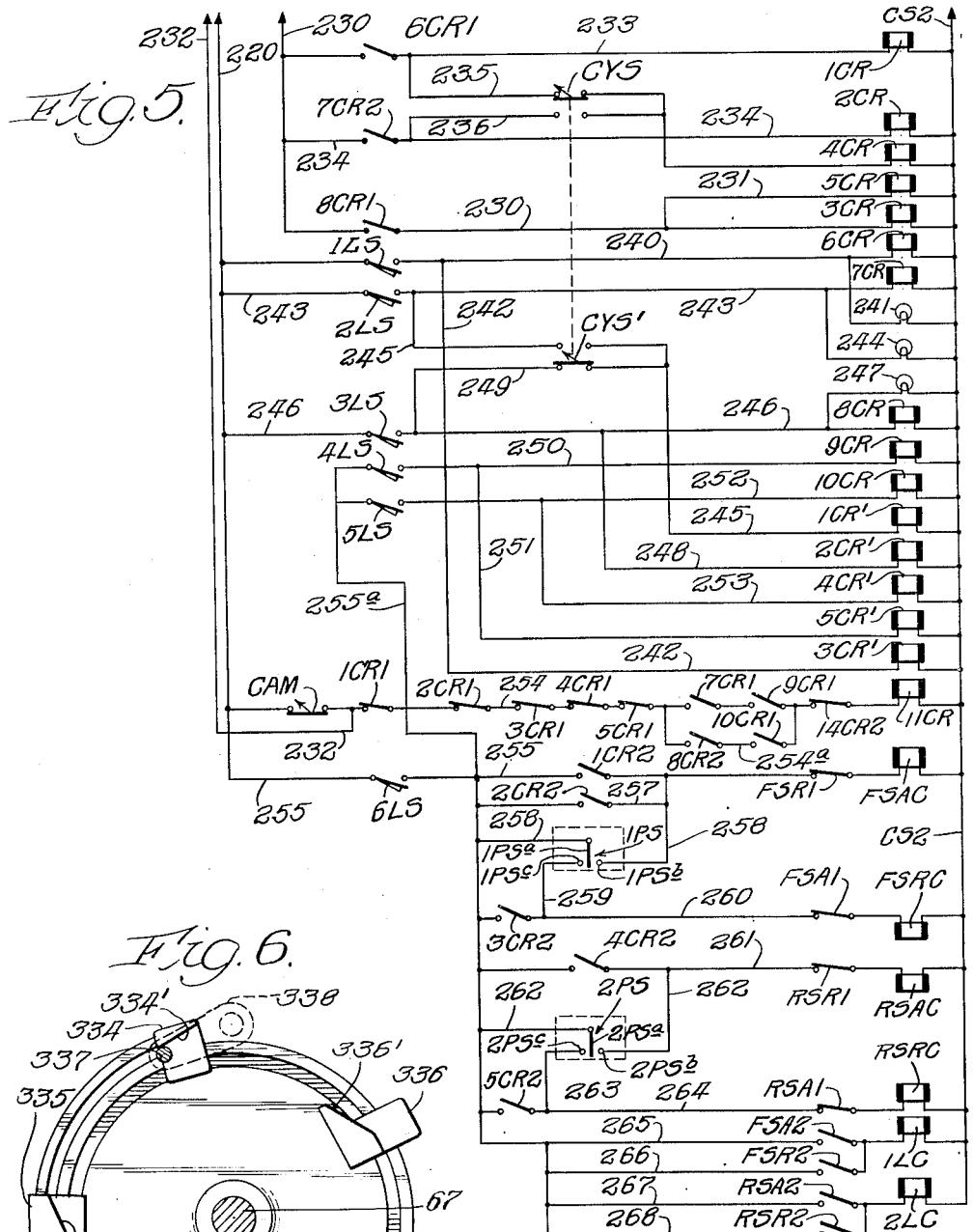
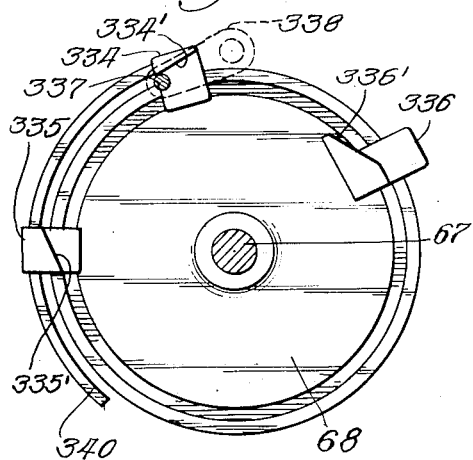

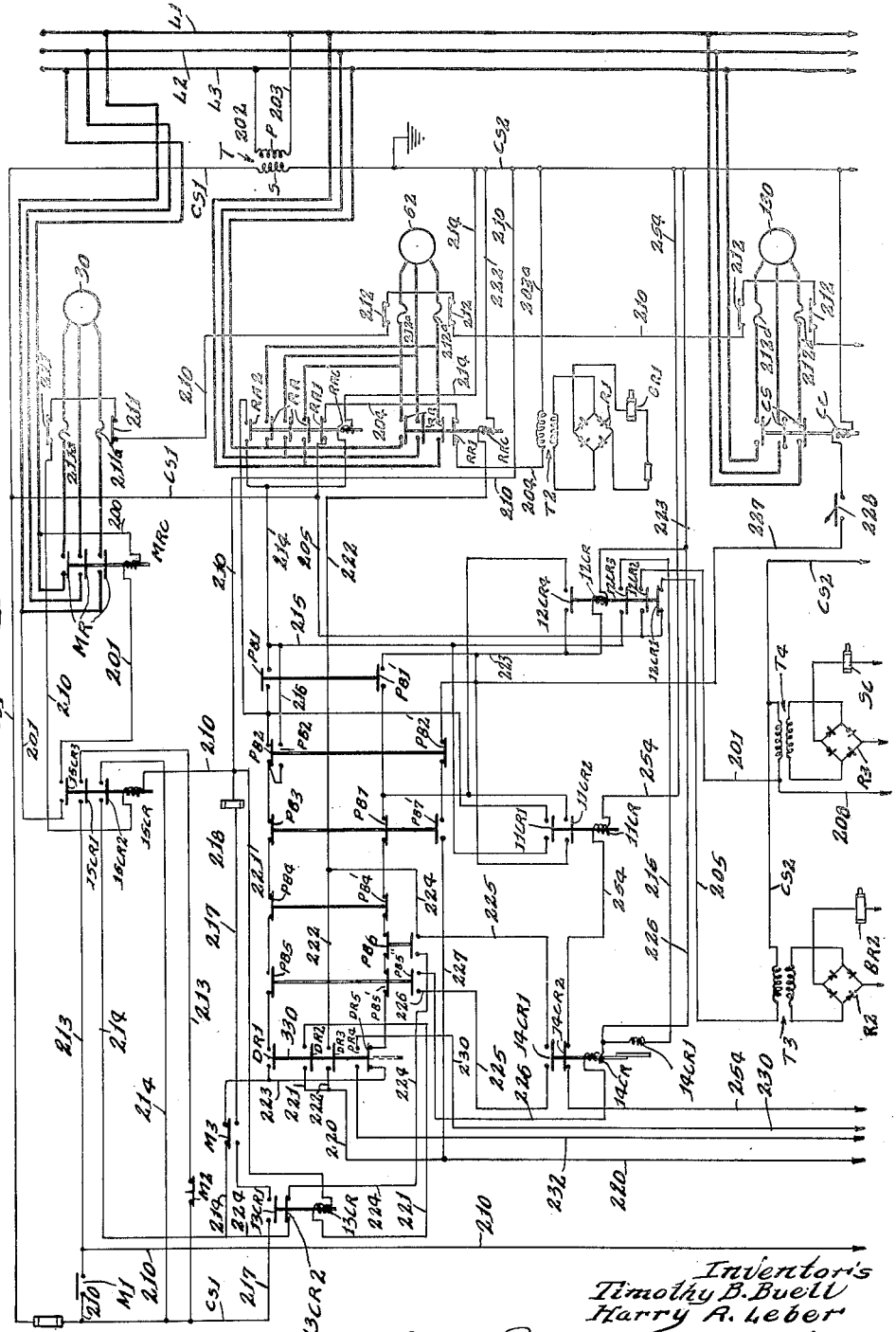

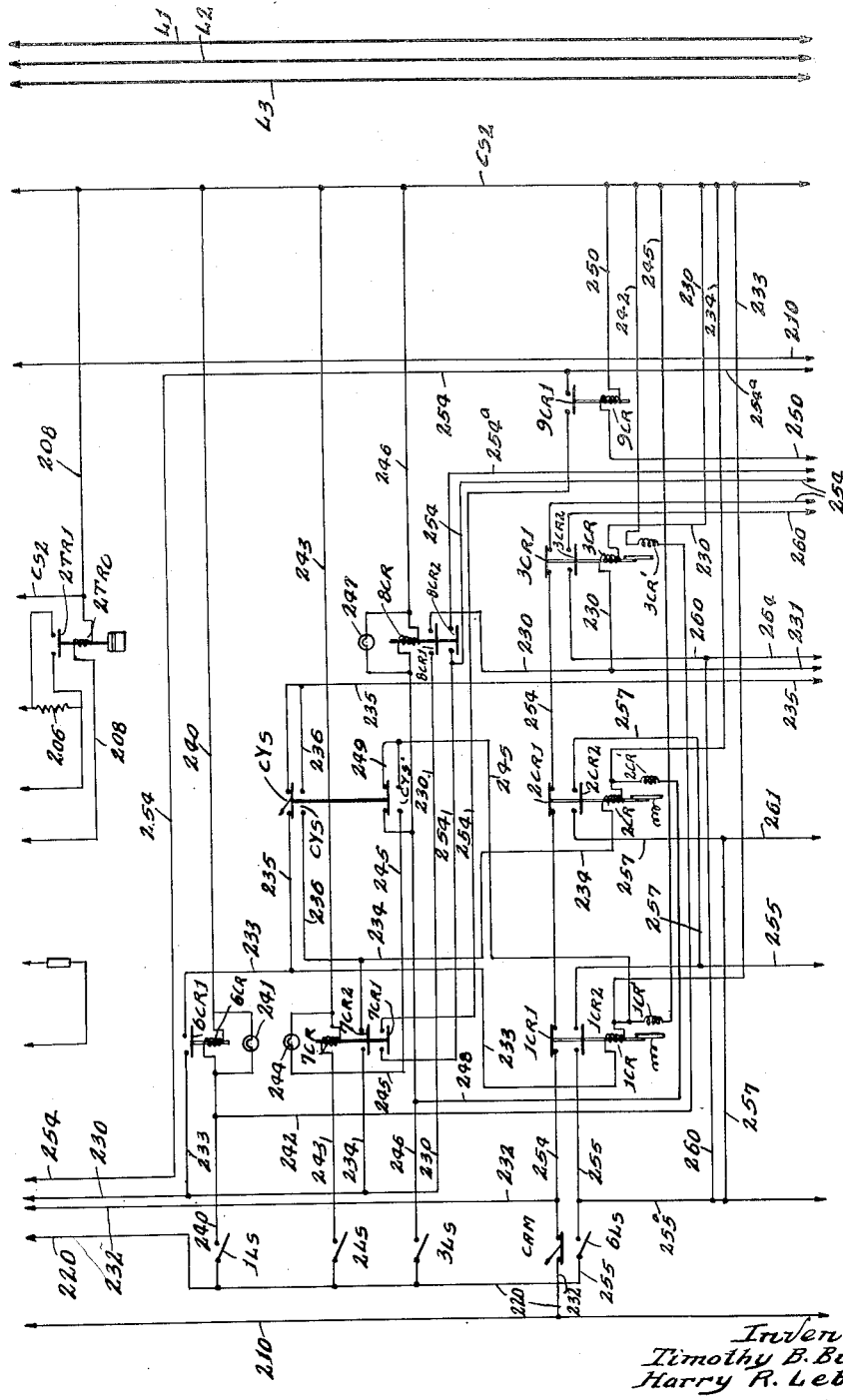

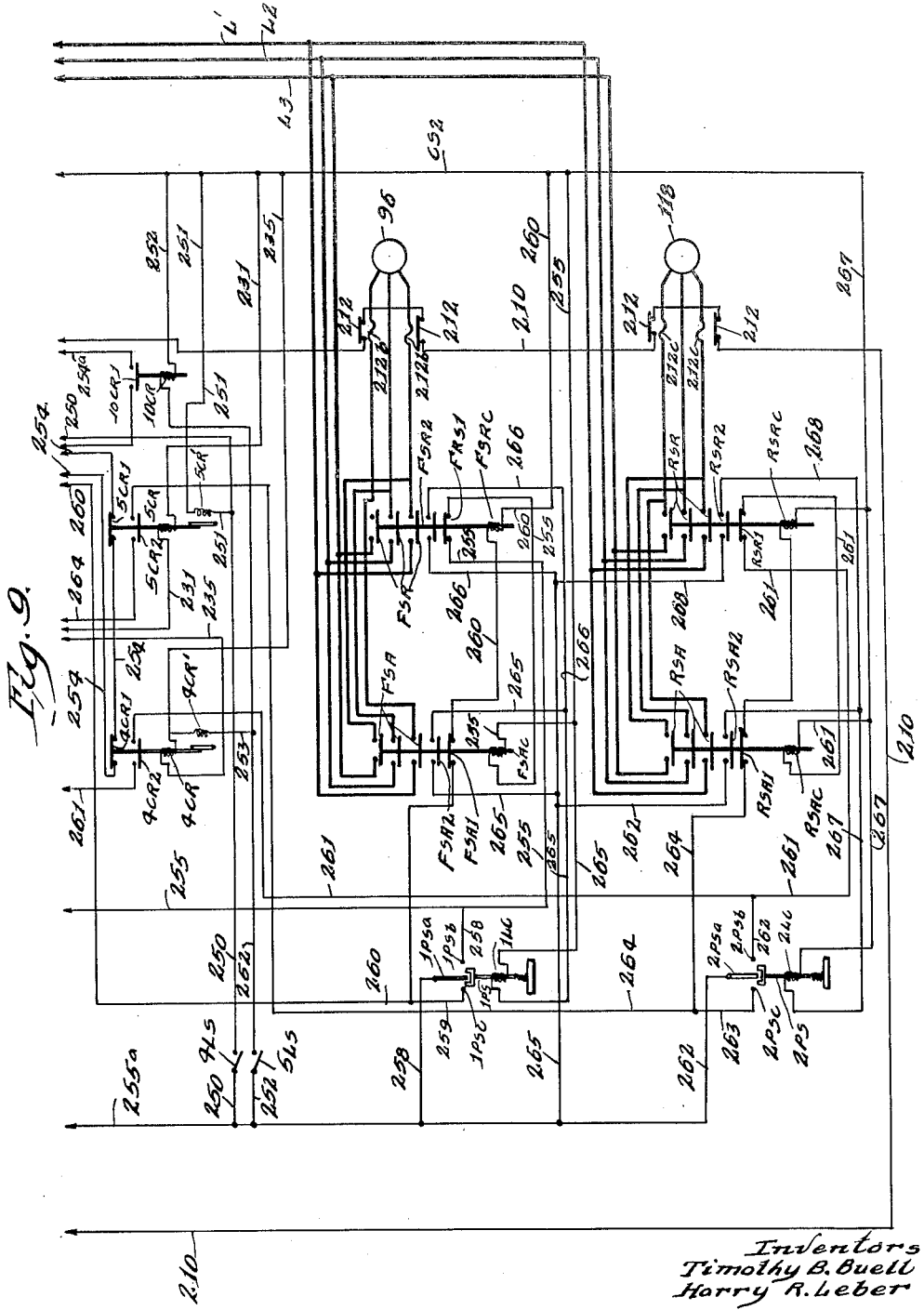

Patented Mar. 3, 1953

2,630,038

UNITED STATES PATENT OFFICE 2,630,038

AUTOMATIC MULTIPLE CYCLE APPARATUS FOR MACHINE TOOLS

Timothy B. Buell and Harry R. Leber, Rockford, Ill., assignors to Sundstrand Machine Tool Co., Rockford, Ill., a corporation of Illinois Application October 7, 1948, Serial No. 53,192

15 Claims. (Cl. 82—14)

The invention relates to manufacturing lathes and the provision of mechanism therein for automatically repeating cyclic movements of tools to remove two or more layers of material from a work piece with a single setting of the machine. It is the general object of the invention to provide a new and improved lathe of this character.

Another object is to provide a lathe having front and rear carriages movable longitudinally of the work spindle axis and front and rear tool supporting cross slides carried upon said carriages respectively, means for actuating said front carriage and slide to advance tools thereon to the work and then perform a turning operation during which the tools move longitudinally of the work axis, after which the tools are withdrawn from the work and returned to their starting position, means for moving the rear slide towards and from the work axis to cause tools thereon to perform a facing operation, means for adjusting the tools on the cross slides to change the depth of cut thereof, and means for controlling said slide actuating means to effect said movements and to repeat the movements automatically for a second cut with the tools adjusted to a new depth of cut.

Other objects and advantages will become readily apparent from the following detailed description taken in connection with the accompanying drawings, in which:

Fig. 1 is a fragmentary plan view of a lathe embodying a preferred form of the invention;

Fig. 2 is a transverse section approximately along the line 2—2 of Fig. 1;

Fig. 3 is a diagrammatic view of the gearing for actuating the work and tool supports;

Figure 4:
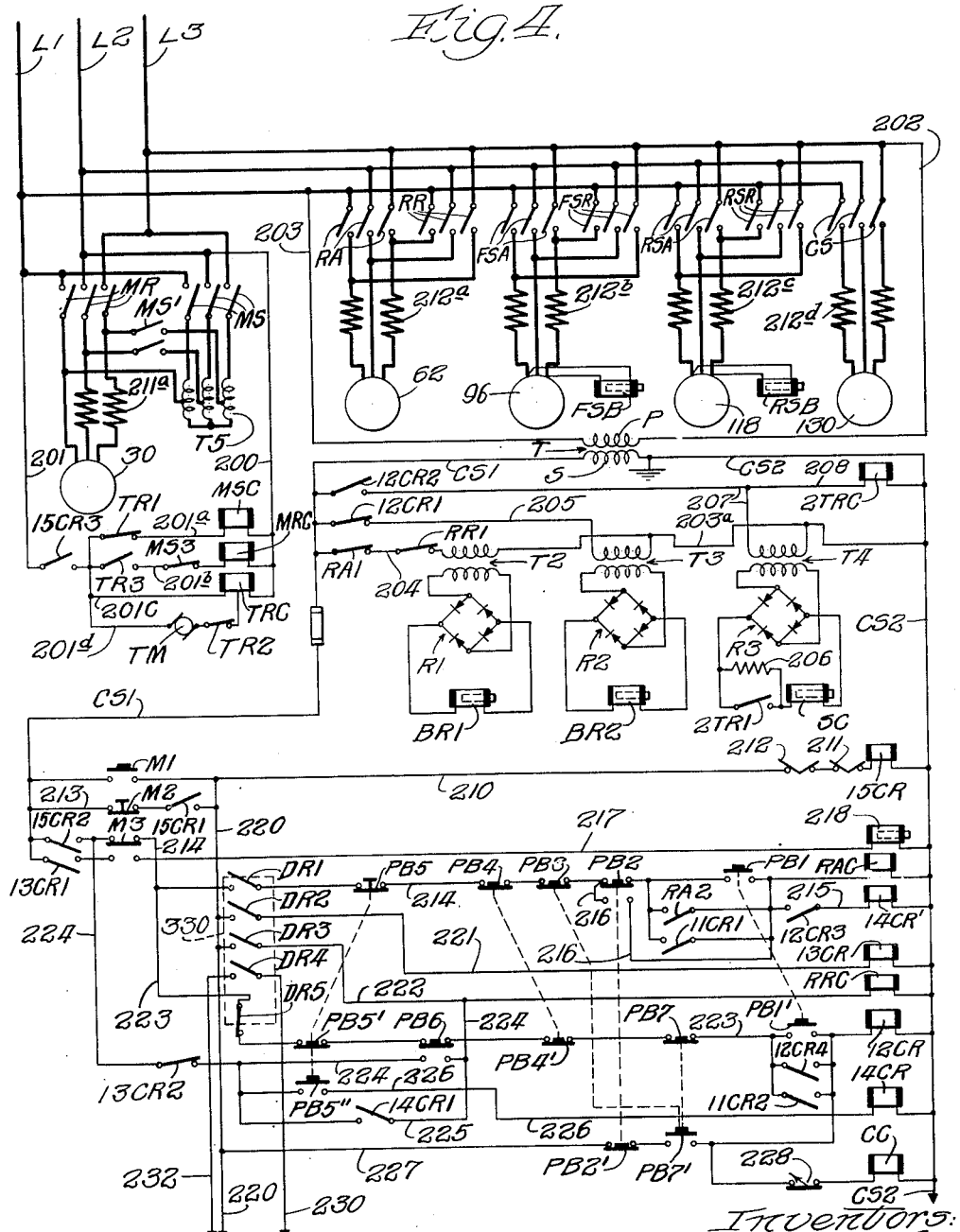

Figs. 4 and 5 comprise together a wiring diagram of electrical circuits; and

Fig. 6 is a fragmentary detail view of a portion of the mechanical control mechanism; and Figs. 7, 8 and 9 comprise together another type of wiring diagram substantially equivalent to Figs. 4 and 5, but with parts of the starting and braking circuits omitted for simplicity.

While we have shown in the drawings and shall herein describe in detail a preferred form of the invention, it is not intended to limit the invention to the particular form and arrangement shown. The scope of the invention will be pointed out in the appended claims.

In the drawings, the invention is embodied in a lathe having a bed 20, a work spindle 21 rotatably mounted in a head stock 22 and carrying a work piece W, a front carriage 23 slidably supported on the bed for movement longitudinally of the work spindle, a front tool cross slide 24 movable transversely on the front carriage and adapted to support one or more turning tools 25, a rear carriage 26 adjustably supported on the bed for movement longitudinally of the work spindle, and a rear tool cross slide 27 movable transversely on the rear carriage and adapted to support one or more facing tools 28.

The actuating mechanisms for the work supporting spindle 21 and the tool supports are shown somewhat diagrammatically in Figs. 1 to 3 and are generally of the type disclosed in U. S. Letters Patent No. 2,144,735 dated January 24, 1939, to Granberg et al. which discloses a lathe of the type wherein the present invention is embodied. The spindle 21 is driven by a motor 30 by means including a belt drive 31, a shaft 32, pick-off gears 33, a shaft 34, a pinion 35, and gear 36. The actuating mechanisms for the carriages and cross slides are adapted to actuate said tool supports at feed and rapid traverse rates. The feed drive comprises gearing connected to the spindle 21 and includes a gear 40 on the spindle, a train of gears 41, a second train of gears 42, a shaft 43, pick-off gears 44, a shaft 45, gears 46, a planetary gear device having a ring gear 47 on a planet carrier, three sets of planetary gears 48 rotatably supported equidistantly apart on said carrier, a sun gear 49 on shaft 50, pinion 51 also on shaft 50, and a gear train 52 to a front carriage feed screw 53 having screw threads 54 therein engageable with a nut 55 on the front carriage 23.

For driving the front carriage at a traverse rate, the left hand planet gears 48 engage a second sun gear 56 on a shaft 57 which has a pulley 58 connected by a belt 59, and a pulley 60 on the shaft 61 of a reversible rapid traverse motor 62. An electric solenoid brake 63 is associated with the other end of the motor shaft 61 and is operable when deenergized to hold the motor shaft against rotation and thereby hold the sun gear 56 stationary. When the traverse motor 62 is operated the drive therefrom to the planetary gearing is superimposed upon the drive through said gearing from spindle 21 so as to operate shaft 50 at a relatively higher rate in a forward or reverse direction depending upon the direction of the rotation of the traverse motor. A shaft 64 carrying the intermediate gear of the train 52 also has a worm 65 thereon meshing with a worm wheel 66 on a shaft 67 carrying a control drum 68 having dogs which actuate a drum switch 330 through the medium of an actuating arm 338.

For actuating the rear cross slide 27, a gear train 69 drives a shaft 70 which carries one of two pick-off gears 71 the other of which is fixed to a shaft 72 which is splined at 73 and carries a worm 74 which meshes with a worm wheel 75 on a shaft which also carries a cam drum 77. This cam drum has a cam slot with a spiral portion 78 and a dwell portion 79, a roller follower 80 engaging said slot to actuate the rear tool cross slide as hereinafter more fully described.

The control for starting and stopping the spindle motor 30 and for actuating the feed traverse mechanism for the tool supports in order to obtain tool support movements or cycles comprising a rapid advance movement of the tool supports to bring the tools into proximity with the work, followed by a feed movement of the tool supports during the cutting operations and thereafter by a rapid traverse return movement of the supports to return the tools to their initial withdrawn positions is described in said Granberg et al. Patent No. 2,144,735.

The front cross slide 24 is formed with a bore 84 extending transversely of the axis of the work spindle 21. A cylindrical member 85 is slidably mounted in the bore 84 and carries a cam follower roller 86 extending downwardly therefrom into engagement with a cam slot 87 in a cam bar 88. The cam bar is stationarily mounted on the bed 20 of the lathe by means including a bracket 89. As shown in Fig. 1, the cam slot has a portion 87a parallel to the spindle axis, a diagonal portion 87b, and a portion 87c also parallel to the spindle axis. When the cylindrical member 85 is held fixed in the bore 84 the cam follower 86 engages in the slot 87 to move the cross slide transversely of the carriage and towards the spindle axis as the carriage moves longitudinally towards the head stock to carry the follower 86 from the cam slot portion 87a through the portion 87b and into the portion 87c. During this movement of the cross slide and carriage the tools are moved from a withdrawn position diagonally towards the position wherein the cutting operation is started and thereafter during continued movement of the carriage towards the head stock the follower 86 moves in the cam slot portion 87c to maintain the cross slide at its point of farthest advance while the tools perform a turning operation on the work piece W. Upon completion of the turning operation, the carriage drive is reversed to return the carriage at a rapid traverse rate and the tools are retracted first parallel to the work and then diagonally away from the work as the follower 86 passes first along the cam slot portion 87c and thereafter through portion 87b towards or into portion 87a. The follower 86 is at all times maintained in contact with the left hand side of the slot 87 as shown in Figs. 1 and 2 by means of a coil compression spring 89 located intermediate a depending bracket 81 on the cross slide and a collar 82 carried on a rod 83 secured to the carriage 23.

The cylindrical member 85 is adjustable in the bore 84 of the cross slide in order to determine the extent to which the cross slide will be moved toward the spindle axis and thereby determine the depth of cut of the turning tools 25. As shown in the drawings, the member 85 has a central bore 90 and a nut 91 secured in one end thereof. A feed screw 92 engages the nut 91 and also carries a worm wheel 93 which meshes with a worm 94 carried on a shaft 95 of a reversible electric motor 96. A bevel gear 97 on the shaft 95 meshes with a corresponding bevel gear 98 on a shaft 99 which is squared at its outer end 100 to receive a crank to facilitate manual adjustment of the cross slide with respect to the member 85. The manual adjusting means is generally utilized for initial setting up of the lathe and determining the depth of the cut of the turning tools 25 on the first roughing cut. When it is desired to take two or more successive cuts automatically on the work piece, the second adjustments for the second and third cuts are preferably obtained by use of the motor 96 and control hereinafter more fully described. As illustrated in Figs. 1 and 2, the control includes limit switches 1LS, 2LS and 3LS supported on the cross slide 24 and arranged to be actuated by switch actuating members 105 extending radially from a disk 105a on the upper end of a shaft 106 which is rotatably supported in a vertical bore 107 in the cross slide and at its lower end carries a pinion 108 which meshes with rack teeth 109 on the adjacent side of the cylindrical member 85.

The rear tool cross slide 27 is adjustable transversely of the rear carriage 26 and of the spindle axis by mechanism generally the same as that just described with respect to the front tool cross slide. Thus, the rear slide 27 has a bore 110 in which a cylindrical member 111 is adjustable. This cylindrical member has a central bore 112 and has a nut at the right hand end thereof which is engaged by a feed screw 114 which also carries a worm wheel 115. The worm wheel engages a worm 116 on a shaft 117 of a reversible electric motor 118. A bevel gear 119 is secured on shaft 117 and meshes with a bevel gear 120 on a shaft 121 which is squared at its outer end 122 to receive a manually operable crank. The cylindrical member 111 carries the cam follower roller 80 hereinbefore referred to and also has rack teeth 123 thereon which engage a pinion 124 on the lower end of a vertical shaft 125 which is rotatably supported in the cross slide 27 and which at its upper end carries switch actuating members 126 extending radially from a disk 127. Switches 4LS and 5LS are supported on the cross slide adjacent the switch actuating members so as to be actuated thereby.

Normally, the rear carriage 26 is adjusted longitudinally of the bed 20 by suitable means (not shown) to a desired location so that when the cross slide 27 is moved transversely of the work spindle axis during operation of the machine the facing tools 28 will perform facing operations on the work piece W at the desired points longitudinally of the work piece. These facing operations are generally used to clean out the end of the cuts formed by the turning tools and generally the facing tools are moved inwardly so as to reach their final positions simultaneously with or after the completion of the turning operations.

In the preferred form of the invention illustrated herein, the tool supports are preferably moved to provide a series of two or three turning operations and two facing operations with a single starting of the machine, each turning operation reducing the diameter of the work piece.

The limit switch 1LS is closed by the operating member 105 at the beginning of each cycle of carriage operation and is opened when the front slide completes each adjusting movement; limit switch 2LS is closed at the end of the first front slide adjusting movement; and limit switch 3LS is closed at the end of the second front slide adjusting movement. Limit switch 4LS is similar to 1LS except that it is operated by movements of the rear slide, and limit switch 5LS closes at the end of the rear slide adjusting movement.

The electrical control for obtaining cyclic operation of the machine is illustrated principally in the schematic diagram of Figs. 4 and 5, and 7-9, wherein the control system as disclosed comprises power circuits and control circuits, the latter including the control drum switch 330 actuated by dogs on the drum controller 68. The electrical circuits will be described with reference to Figs. 4 and 5. Equivalent circuits are shown in Figs. 7-9, except for certain portions which have been omitted for simplicity.

POWER CIRCUITS

Line wires L1, L2 and L3 comprise the three lines of a three phase alternating current supply, and the motors which operate the machine are connected across these lines through switching arrangements as will be described. The rapid traverse motor 62 is arranged for connection to said current supply alternatively through a rapid approach switch device having contacts RA or through a rapid return switch device having contacts RR, this alternative arrangement providing a means for reversing the motor to provide advance movement of the front carriage 23 and return movement thereof.

The motor 96 which drives the front cross slide similarly is arranged for connection to the supply alternatively through a front slide approach switch device having contacts FSA or through a front slide return switch device having contacts FSR, this arrangement again providing for reverse operation of the motor. The motor 96 is preferably provided with a spring applied brake of well known construction within a housing designated at 96a in Fig. 1, which housing also contains a "plugging" arrangement including a switch shown schematically at IPS in Fig. 5 and having associated therewith conventional apparatus for opening the switch in response to stopping (or near stopping) of rotation of the motor 96. The brake is released electrically by means including a coil FSB (shown in Fig. 4 only) connected across the motor 96 and arranged to release the brake when said motor is energized.

The motor 118 for driving the rear cross slide is similarly arranged to be connected alternatively to the supply line through a rear slide approach switch device having contacts RSA or through a rear slide return switch device having contacts RSR. Similarly, this motor has a brake within the housing designated at 118a in Fig. 1 and operable by a solenoid coil RSB (shown in Fig. 4 only) which is connected across the motor. Another plugging switch 2PS and associated apparatus is within the housing 118a.

A coolant motor 130 which is provided to drive a pump for circulating coolant through the machine is also arranged to be connected across the line through a switch device having contacts CS. The contacts RA, RR, FSA, FSR, RSA, RSR and CS are electromagnetically operated, these contacts respectively being associated with relay devices, the operating coils of which are in the control portion of the circuit as will be hereinafter described.

The spindle motor 30 is adapted to be connected across the supply line through a switch device having contacts MR. Because of the size of the spindle motor we preferably provide an automatic starting device comprising a transformer T5 which is connected in parallel with the contacts MR through the contacts MS on the line side and the contacts MS' on the motor side. This transformer arrangement is utilized for starting the motor, after which the motor is shifted into direct connection with the line through the contacts MR. This starting arrangement has been omitted from Fig. 7 for simplicity, and in Fig. 7 the spindle motor 30 is shown as being started directly across the line.

It will be seen that while the motors 62, 96, 118 and 130 are started directly across the line, in Fig. 4 the spindle motor 30 is started by a reduced voltage arrangement from the transformer T5 and consequently requires a separate starting circuit. This starting circuit comprises an operating coil MSC which controls the contacts MS and MS' and a normally closed switch MS3, an operating coil MRC which controls the contacts MR, and a timer device including an operating coil TRC, a timer motor TM and normally closed timer relay switches TR1 and TR2 and a normally open timer relay switch TR3. The coils MSC, MRC and TRC are connected generally in parallel, one side of each of said coils being connected to one line wire by means of a lead 200 and the other side of said coils being connected to another line wire by means of a lead 201 which incorporates a normally open switch 15CR3.

In Fig. 4a branch lead 201a connects one side of the switch 15CR3 to the coil MSC and incorporates the normally closed timer switch TR1; a second branch lead 201b connects said switch to the coil MRC and incorporates in series the normally open timer switch TR3 and the normally closed switch MS3 associated with the starting relay coil MSC; a third branch lead 201C connects the switch 15CR3 directly to the coil TRC; and a fourth branch lead 201d is connected between the lead 201C and the coil TRC, the lead 201d incorporating in series the timer motor TM and the normally closed switch TR2.

It will be seen that with this starting arrangement when the switch 15CR3 (which is controlled by an operating coil in the control portion of the circuit) is closed the coil MSC is energized, closing the contacts MS and MS' to start the motor through the low voltage transformer T5, while the switch MS3 in series with the coil MRC is opened. Additionally, closure of the switch 15CR3 energizes the timer coil TRC and timer motor TM, and after a predetermined lapse of time this motor operates the timer to cause the switches TR1 and TR2 to open and the switch TR3 to close. Switch TR1 breaks the circuit to the coil MSC, cutting out the transformer T5 while closure of the switch TR3 (and simultaneous closing of switch MS3 when coil MSC is deenergized) makes the circuit to the coil MRC, and energization of this coil closes the contacts MR and connects the motor directly to the line. The timer motor is no longer energized because the switch TR2 is now open.

CONTROL CIRCUITS

The control circuits as shown are adapted to provide a two cut cycle or a three cut cycle of machine operation. A cycle switch CYS (see Fig. 5) is arranged to select the cycle desired. When this switch is set for a two cut cycle as shown, the machine runs through two cuts before stopping. At the end of the first cut the front and rear cross slides both advance to the next position before the cycle resumes. At the end of the cycle they both return to their original position.

For the three cut cycle the front cross slide advances one position for each cut and returns to its original position after the third cut. The rear cross slide feeds to the same depth for the first two cuts and advances for a deeper cut between the second and third cuts, returning to its original position after the third cut.

For supplying control current a transformer T is provided, said transformer having its primary P connected across supply lines L1 and L3, a lead 202 connecting one end of said primary to the line wire L3 and a lead 203 connecting the other end of said primary to the line L1. The secondary S of the transformer is connected to control supply lines CS1 and CS2, one of these lines (CS2 as illustrated) being grounded if so desired.

A brake is provided for the rapid motor 62, this brake being of conventional construction and being designated at 63 in Fig. 3. The brake is operated by a solenoid release coil BR1, this coil being adapted to be energized with direct current obtained from a rectifying device R1 of well known construction. The input to the rectifying device is connected across the secondary of a transformer T2. One end of the primary of this transformer is connected to the control lead CS2 by means of a lead 203a and the other end of the primary is connected to the control supply lead CS1 by a lead 204 incorporating series connected normally closed relay switch RR1 which is associated with the relay which controls operation of the motor 62 in reverse direction and normally closed relay switch RA1 which is associated with the relay which controls operation of the motor 62 in advance direction. When both switches RA1 and RR1 are closed the coil BR1 is energized and the brake is set, and whenever either switch is open the brake is released. The coil BR2 of a solenoid brake 30a for the spindle motor is similarly energized by direct current from a rectifier R2 having its input terminals connected across the secondary of a transformer T3. One end of the primary of this transformer is connected to the lead CS2 and the other end is connected to lead CS1 by a lead 205 which incorporates a normally closed relay switch 12CR1.

The spindle motor drives through a magnetic clutch having an operating coil SC which receives DC energization from a rectifier R3. The circuit connecting one end of the coil SC to the rectifier has a resistor 206 incorporated therein, and a normally open timer relay switch 2TR1 is connected across the resistor. The input terminals of the rectifier are connected across the secondary of a transformer T4, one end of the primary of this transformer being connected to the lead CS2 and the other end being connected to the control lead CS1 by a lead 207 which incorporates a normally open relay switch 12CR2.

When the switches 12CR1 and 12CR2 are in the positions shown the spindle brake is set and the clutch between the spindle and the spindle motor is disengaged. When the switches are operated so that 12CR1 is opened and 12CR2 is closed the coil BR2 is deenergized to release the spindle brake and the clutch solenoid SC is energized to cause the clutch to engage. When the clutch first engages as the circuit is first closed a portion of the voltage output of the rectifier R3 is developed across the resistor 206, reducing the current through the operating coil SC, and the clutch is caused to pick up smoothly. The operating coil 2TRC of the timer relay is connected in a lead 208 which extends from the lead 207 to the control lead CS2 so that this coil is energized when the switch 12CR2 is closed. When the relay times out, switch 2TR1 associated therewith closes, shorting out the resistor 206 and reducing the resistance in the circuit including the coil SC so that the current through the coil SC is increased and the clutch is engaged with full force.

The control circuit also includes the operating coil 15CR of a starting relay for the spindle motor 30. This relay has associated therewith three normally open switches 15CR1, 15CR2 and 15CR3, the latter of these switches being in the lead 201 in the spindle motor starting circuit as earlier described. The coil 15CR is connected in a lead 210 which extends between the control leads CS1 and CS2, the lead 210 incorporating in series with the coil a thermal overload switch 211 operable as a function of current flow through overload devices 211a which are in series with the spindle motor; a thermal overload switch 212 operable as a function of current flow through any of overload devices 212a, 212b, 212c or 212d connected in the circuits of the motors 62, 96, 118 and 130, respectively; and a "run" normally open push button switch M1. A lead 213 is connected in parallel with the run switch M1 and incorporates in series a normally closed "stop" push button switch M2 and the normally open relay switch 15CR1.

It will be seen from Fig. 4 that closure of the switch M1 will energize the coil 15CR, resulting in closure of the switches associated therewith. Closure of the switch 15CR1 completes a holding circuit around the button M1 so that the coil 15CR will remain energized after the button M1 has been released and until the stop switch M2 is opened. Closure of the switch 15CR3 will energize the starting circuit for the spindle motor in the manner above described, this motor being energized first through the contacts MS and MS' and the reduced voltage transformer T5, and after the time delay provided by the relay TR the spindle motor is switched directly across the line through the contacts MR. It will also be seen that in the event of an overload on any of the motors one of the switches 211 or 212 will open and the spindle motor will stop.

The rapid traverse motor 62 which controls traverse movement of the front carriage 23 is energized for movement in a forward direction by closure of the contacts RA. This is accomplished by energizing a relay coil RAC which controls these contacts and also controls the switch RA1 in the rapid motor brake circuit and a normally open switch RA2. The coil RAC is connected in a lead 214 which extends between the control leads CS1 and CS2 and which incorporates in series two normally open contacts of a "cycle start" push button PB1, two normally closed contacts of a "jog approach" push button PB2, a normally closed push button PB3, two normally closed contacts of a "cycle stop" push button PB4, two normally closed contacts of an "emergency return" push button PB5, a mechanically operated switch comprising a pair of contacts DR1 on a drum control switch 330, a normally closed pair of contacts of a "clamp-unclamp" push button switch M3, and contacts 15CR2 which are closed when the coil 15CR is energized to start the spindle motor, thus providing an interlock between the spindle motor and the forward operation of the rapid traverse motor.

The drum control switch 330 which is mechanically operated by means of dogs during the machine cycle and is similar to the switch disclosed in the above mentioned Granberg application, comprises five switches, DR1, DR2, DR3, DR4 and DR5 shown in Fig. 4. The drum control switch has three positions: a feed or neutral position wherein switches DR1, DR2, DR3 and DR4 are open and switch DR5 is closed; a rapid approach position wherein switches DR1, DR2 and DR5 are closed and switches DR3, DR4 are open; and a rapid return position wherein switches DR1, DR2 and DR5 are open and switches DR3 and DR4 are closed.

The mechanical operation of the drum switch is shown and described in detail in Granberg et al., Patent No. 2,144,735. Briefly, in addition to the switches shown diagrammatically in Fig. 4 the switch comprises a control or actuating mechanism shown in Fig. 6. As explained in detail in the above mentioned patent, the drum switch is operated by rocking a shaft between three positions to obtain the switch action above described. The means for rocking the shaft automatically in timed relation to the movement of the front carriage 23 comprises dogs on the drum controller 68 which is fixed on the end of the shaft 67 extending parallel with the shaft of the drum switch, the shaft 67 being connected to the drive for the front carriage as shown in Fig. 3. Adjustably mounted on the periphery of the controller disc 68 (which may be graduated to facilitate the spacing) are dogs 334, 335 and 336. Disposed to be acted upon by the dogs during the rotation of the disc 68 is a pin 337 projecting from an arm 338 which is fixed to the rockable shaft of the drum switch. The dog 334 has a cam surface 334' which engages the pin 337 to rock the shaft from rapid approach to feed or neutral position. Dog 335 has a cam surface 335' which engages the pin 337 to rock the switch from feed to rapid return position, and dog 336 has a cam surface 336' which engages the pin to rock the switch from rapid return to feed or neutral position. Connected between the dog 334 and the dog 335 is an arcuate bar 340 which overlies the pin 337 and prevents rocking of the switch either manually or automatically from feed to rapid approach position while the front carriage 23 is within the limits of feed movement as defined by the spacing of dogs 334 and 335, thereby assuring that neither the work nor the machine will be injured by a sudden thrust of the tool into the work.

From the above description it will be seen that with the coil 15CR energized to close switch 15CR2, and with the drum switch in rapid approach position so that DR1 is closed, if the cycle start push button PB1 is manually closed and the other push buttons in the lead 214 are closed as shown, the coil RAC is energized, closing the contacts RA to connect the rapid motor 62 across the supply line and opening the switch RA1 to release the rapid motor brake 63. A subsidiary circuit generally in parallel with the cycle start push button PB1 and having a portion in parallel with the coil RAC includes the relay switch RA2 associated with the coil RAC which forms a holding circuit around the cycle start push button PB1. Another relay operated switch 11CR1 is connected in parallel with the cycle start push button PB1 and the switch RA2, and the point intermediate the switches 11CR1, RA2 and the push button PB1 provides a connection for a lead 215 extending to the control lead CS2 in parallel with the coil RAC and incorporating a normally open switch 12CR3 and a release coil 14CR' for a latching relay having associated therewith a normally open switch 14CR1 and a normally closed switch 14CR2. The point intermediate the switches 11CR1—RA2 and the cycle start push button PB1 is also connected to the lead 214 through a pair of normally open contacts of the jog approach push button PB2 by means of a lead 216.

The control circuits for providing the desired cyclic operation of the machine including the automatic provision of a plurality of cuts of different depth include a lead 217 connected between the control leads CS1 and CS2 and incorporating a tail stock air valve solenoid 218, a normally open pair of contacts on the stop push button M3, and a normally open relay switch 13CR1. A lead 220 is connected to the lead 210 intermediate the push button M1 and the overload switch 212, and from the lead 220 a branch lead 221 connects with the control lead CS2, this branch lead incorporating the switch DR2 on the drum control switch and the operating coil 13CR of a relay having associated therewith the normally open switch 13CR1 which is connected in the lead 217, and a normally closed switch 13CR2 which provides an interlock in the emergency return circuit as will be hereinafter described.

Another branch lead 222 extends from the lead 220 to the control lead CS2 and incorporates the switch DR3 of the drum controller and the coil RRC for operating the contacts RR in the circuit of the rapid motor 62 and for controlling the switch RR1 in the rapid motor brake circuit. A lead 223 is connected to the lead 214 intermediate the clamp-unclamp push button M3 and the switch DR1, said lead being connected at its other end to the control lead CS2 and incorporating therein in series the switch DR5 on the drum controller, a second set of normally closed contacts PB5' of the emergency return push button, two normally closed contacts of a "jog return" push button PB6, a second set of normally closed contacts PB4' of the cycle stop push button PB4, a normally closed "jog spindle" push button PB7, a second set of normally open contacts PB1' of the cycle start push button PB1 and the operating coil 12CR of a relay having a normally closed switch 12CR1 in the circuit of the spindle brake coil BR2 earlier described and three normally open switches 12CR2, 12CR3 and 12CR4, the switch 12CR2 being in the circuit of the spindle clutch solenoid SC as earlier described, and the switch 12CR3 being in series with the release coil 14CR' as earlier described. The switch 12CR4 is connected in parallel with the switch PB1' to form a holding circuit around these contacts of the cycle start push button after the push button is released. Another normally open relay switch 11CR2 is connected in parallel with both the switch PB1' and the switch 12CR4.

Another lead 224 has one end connected to the lead 214 intermediate the switch 15CR2 and the clamp-unclamp push button M3 and is connected at its other end to the lead 222 intermediate the switch DR3 and the coil RRC, the lead 224 incorporating the normally closed switch 13CR2 and a set of normally open contacts of the jog return push button PB6. A lead 225 connects the normally open switch 14CR1 across the open contacts of the push button PB6, and a lead 226 is connected to the lead 225 and to the control lead CS2 and incorporates a third normally open set of contacts PB5'' of the emergency return push button switch PB5 and the latching coil 14CR of the relay above referred to in connection with the release coil 14CR'.

Another branch lead 227 is connected between the lead 220 and the control lead CS2 and incorporates a second set of normally closed contacts PB2' of the jog approach push button switch, a normally open set of contacts PB7', a coolant "off-on" switch 228, and the operating coil CC for operating the contacts CS in the circuit of the coolant motor 130. As seen in Fig. 4 the switch PB7' is ganged with the switch PB7 and the switch PB3.

Switch DR4 on the drum control switch has one side connected by a lead 230 to the control lead CS2, the lead 230 incorporating a normally open relay actuated switch 8CR1 and the latching coil 3CR of a relay having associated therewith a normally closed switch 3CR1 and a normally open switch 3CR2. Another lead 231 connects a latching coil 5CR directly in parallel with the coil 3CR. The coil 5CR operates a control relay having associated therewith a normally closed switch 5CR1 and a normally open switch 5CR2. The other side of the switch DR4 is connected by a lead 232 to one side of a "cycle auto-manual" switch CAM, the other side of this switch being connected to the lead 220.

A branch lead 233 is connected at one end to the lead 230 intermediate the switches DR4 and 8CR1 and at the other end to the control lead CS2, the lead 233 incorporating a normally open relay actuated switch 6CR1 and the latching coil 1CR of a relay having associated therewith a normally closed switch 1CR1 and a normally open switch 1CR2. A parallel branch lead 234 similarly is connected between the leads 230 and CS2 and incorporates a normally open relay actuated switch 7CR2 and the latching coil 2CR of a relay having a normally closed switch 2CR1 and a normally open switch 2CR2. Another lead 235 is connected at one end to the lead 233 intermediate the switch 6CR1 and the coil 1CR and is connected at the other end to the control lead CS2, said lead 235 incorporating a pair of normally closed contacts of the cycle selecting switch CYS and the latching coil 4CR of a relay having associated therewith a normally closed switch 4CR1 and a normally open switch 4CR2. The switch CYS has a pair of normally open contacts which are incorporated in a lead 236 one end of which is connected to the lead 234 intermediate the switch 7CR2 and the coil 2CR and the other end of which is connected to the lead 235 intermediate the cycle switch CYS and the coil 4CR.

A lead 240 is connected between the lead 220 and the control lead CS2 and incorporates the normally open limit switch 1LS which is mounted on the front cross slide of the machine, and the operating coil 6CR of a relay having one normally open switch 6CR1 associated therewith, said switch being in the lead 233 in series with the latching coil 1CR as earlier described. A first cycle indication lamp 241 is connected in parallel with the coil 6CR and is illuminated whenever said coil is energized. A lead 242 is connected at one end to the lead 240 intermediate the limit switch 1LS and the coil 6CR, and at the other end to the control lead CS2 and incorporates the release coil 3CR'.

A lead 243 is connected between the leads 220 and CS2 in parallel with the lead 240 and incorporates the second limit switch 2LS and the operating coil 7CR of a relay having two normally open switches 7CR1 and 7CR2 associated therewith, the switch 7CR2 being in the lead 234 in series with the latching coil 2CR earlier described. A second cycle lamp 244 is connected across the coil 7CR and is illuminated whenever said coil is energized, and a lead 245 extends from the lead 243 intermediate the limit switch 2LS and the coil 7CR and connects to the control lead 2CS. The lead 245 incorporates a normally open pair of contacts CYS' of the cycle switch CYS and the release coil 1CR'.

Another circuit generally parallel with the leads 240 and 243 comprises a lead 246 connected between the lead 220 and the control lead CS2 and incorporating the third limit switch 3LS and an operating coil 8CR of a relay having two normally open switches 8CR1 and 8CR2 associated therewith, the first of these being in the lead 230 in series with the latching coil 3CR. A third cycle lamp 247 is connected across the coil 8CR and is illuminated whenever this coil is energized. The release coil 2CR' is connected in parallel with the coil 8CR by means of a lead 248, and a lead 249 is connected between the leads 245 and 246 and incorporates two normally closed contacts of the cycle switch CYS'.

The limit switch 4LS which is carried on the rear cross slide of the machine is connected in a lead 250, one end of which is connected to the control lead CS2 and which incorporates the operating coil 9CR of a relay having a single normally open switch 9CR1. A branch lead 251 extends from the lead 250 intermediate the limit switch 4LS and the coil 9CR to the control lead CS2 and connects the release coil 5CR' in parallel with the operating coil 9CR. A circuit parallel to that just described comprises a lead 252 which extends from the fifth limit switch 5LS to the control lead CS2 and which incorporates the operating coil 10CR of a relay having a single normally open switch 10CR1 associated therewith. The release coil 4CR' is connected in parallel with the coil 10CR by means of a lead 253.

Another lead 254 extends from the lead 232 adjacent the switch CAM to the control lead CS2 and has incorporated therein in series the normally closed relay switches 1CR1, 2CR1, 3CR1, 4CR1 and 5CR1; the normally open relay switches 7CR1 and 9CR1; the normally closed relay switch 14CR2; and the operating coil 11CR of a relay having the two normally open switches 11CR1 and 11CR2 associated therewith, the first of these being connected across the cycle start push button contacts PB1 and the second being connected across the cycle start push button contacts PB1'. A lead 254a connects the switches 8CR2 and 10CR1 in parallel with the switches 7CR1 and 9CR1.

The other end of the leads 250 and 252 are connected by a lead 255a to a lead 255 which extends from the lead 220 to the control lead CS2 and which incorporates in series a sixth limit switch 6LS, the above mentioned normally opened switch 1CR2, a normally closed switch FSR1 and the operating coil FSAC, this last mentioned coil controlling the contacts FSA in the front slide motor circuit and having a normally closed switch FSA1 and a normally open switch FSA2 associated therewith. As shown in Fig. 5 the point of connection of the leads 250 and 252 with the lead 255 is between the switches 6LS and 1CR2. The limit switch 6LS is closed when the lathe has completed a cycle and is ready for loading.

The normally open switch 2CR2 is connected around the switch 1CR2 by means of a lead 257 and another lead 258 is also in parallel with the switch 1CR2 and incorporates the movable contact 1PSa and one stationary contact 1PSb of a single pole, double throw plugging switch 1PS for the front slide motor. The other contact 1PSc of this switch is connected by a lead 259 to another lead 260 which is generally parallel with the lead 255 and extends from the lead 255 at its juncture with lead 255a to the control lead CS2. The lead 260 incorporates in series the normally open switch 3CR2, the normally closed switch FSA1, and the actuating coil FSRC for the contacts FSR which are utilized to obtain reverse operation of the front slide motor 96. This relay also has associated therewith the normally closed switch FSR1 in the lead 255 and the normally open switch FSR2. Another lead generally parallel with the leads 255 and 260 is designated at 261 and includes the normally open switch 4CR2, a normally closed relay actuated switch RSR1, and the actuating coil RSAC which controls the contacts RSA in the rear slide motor circuit, this relay also having a normally closed switch RSA1 and a normally open switch RSA2.

A lead 262 is connected around the switch 4CR2 and incorporates the movable contact 2PSa and one stationary contact 2PSb of a second plugging switch 2PS for the rear slide motor, this plugging switch being a single pole double throw switch similar to 1PS and having its other stationary contact 2PSc connected by a lead 263 to a lead 264 which is generally parallel to the leads 255, 260 and 261 and which incorporates the normally open switch 5CR2, the normally closed switch RSA1 and the actuating coil RSRC for the contacts RSR utilized to obtain reverse operation of the rear slide motor. The coil RSRC also controls the normally closed switch RSR1 in the lead 261 and a normally open switch RSR2.

Another lead generally parallel with the lead 264 is designated at 265 and incorporates the switch FSA2 and a safety latch coil 1LC for the plugging switch 1PS. The switch FSR2 is connected in parallel with the switch FSA2 by means of a lead 266. Another safety latch coil 2LC for the plugging switch 2PS is connected in parallel with the coil 1LC by means of a lead 267 which incorporates the switch RSA2 and said coil 2LC, and the switch RSR2 is connected in parallel with said switch RSA2 by means of a lead 268.

OPERATION

*Automatic three cut cycle—First cut*

To start the cycle after the cycle switch CYS has been moved from its two cut position as shown to its three cut position, the "run" push button M1 is closed to energize the coil 15CR, this circuit being readily traceable through the lead 210. Energization of this relay coil causes closure of its associated switches 15CR1, 15CR2 and 15CR3. Closure of switch 15CR3 starts the spindle motor 30 through the reduced voltage starting arrangement including the transformer T5 in the manner earlier described. After a predetermined lapse of time the timer motor TM operates the timer, causing timer switches TR2 and TR3 to close and switch TR1 to open, breaking the reduced voltage starting circuit and connecting the spindle motor 30 directly to the supply line through the contacts MR, this operation having also been earlier described.

The closed switch 15CR1 completes the holding circuit around the "run" button M1, and the closed switch 15CR2 completes a circuit through the normally closed "clamp" button M3 to switches DR1 and DR5 of the drum control switch. The drum control switch 330 has been shifted by dogs on the controller disc 68 to its rapid approach position wherein, as earlier explained, switches DR1, DR2 and DR5 are closed; and limit switch 6LS has been closed by another dog in the machine when the lathe has completed a cycle of operation on a work piece and is ready for loading another work piece. Coil 13CR is energized through the closed switch DR2. As the machine starts operation limit switch 1LS on the front cross slide will be closed by the mechanism shown in Fig. 1, thus completing a circuit to energize coil 6CR (thereby closing normally open contacts 6CR1) and to energize the unlatching coil 3CR′, thus leaving contacts 3CR1 closed and 3CR2 open. These circuits may be traced as follows: control lead CS1, run switch M1 (and its parallel holding circuit), lead 220 and lead 240 incorporating switch 1LS and coil 6CR. The unlatching coil 3CR′ is connected in parallel with the coil 6CR by the lead 242.

The limit switch 4LS on the rear cross slide will be closed by the actuating member on the mechanism shown on Fig. 1 to energize coil 9CR and unlatching coil 5CR′. These circuits may be traced as follows: control lead CS1 to lead 220 as earlier described, lead 255 through limit switch 6LS, lead 255a, and lead 250 through limit switch 4LS and coil 9CR, the unlatching coil 5CR′ being connected in parallel with the coil 9CR. Closure of this circuit closes the normally open switch 9CR1 and places the normally open switch 5CR2 in open position and the normally closed switch 5CR1 in closed position.

With the circuits in this condition, closing the cycle start push button PB1 will energize coil RAC of the rapid approach starter, this circuit being traced from lead CS1 through lead 214, all the switches in lead 214 now being closed. Energization of the coil RAC causes contacts RA to close to start the rapid traverse motor 62 in the rapid approach direction. A holding switch RA2 is simultaneously closed to maintain the circuit through the coil RAC, this last mentioned switch being in parallel with the push button PB1. Push button PB1 has a mechanical connection with push button PB1′ which simultaneously closes to energize coil 12CR, this circuit being from CS1 through lead 214 and lead 223 incorporating drum switch DR5 and a series of closed push button switches. When the coil 12CR is energized a holding circuit around the push button PB1′ is established through the now closed switch 12CR4. Closing the switch 12CR2 energizes the spindle clutch solenoid SC through a circuit earlier described, and opening the switch 12CR1 deenergizes the spindle brake release solenoid BR2 through a circuit earlier described so that the brake is released, while closure of switch 12CR3 causes the unlatching coil 14CR′ to be energized. The rapid approach movement of the tools then continues until dog 334 throws the drum switch into its feed position wherein switches DR1, DR2, DR3 and DR4 are open and the left side (in Fig. 4) of switch DR5 is closed.

Opening of switch DR1 stops the rapid traverse motor by breaking the circuit to the coil RAC so that contacts RA open and switch RA1 closes to energize the brake solenoid BR1. Opening of drum switch DR2 deenergizes coil 13CR, thereby opening the switch 13CR1 in the lead 217 and closing the switch 13CR2 in the lead 224.

The spindle motor 30 then continues to operate to drive the spindle and the tools continue to move at a feed rate until dog 335 operates the drum switch and moves it to rapid return position wherein switches DR1, DR2 and DR5 are open and switches DR3 and DR4 are closed.

The opening of switch DR5 breaks the lead 223 and deenergizes relay coil 12CR to disengage the spindle clutch by opening the switch 12CR2, and to set the spindle brake by closing the switch 12CR1. Closing of drum switch DR3 energizes coil RRC through lead 222, thereby closing contacts RR to operate the rapid traverse motor 62 in its return direction and opening switch RR1 to release the traverse motor brake. Closing of drum switch contacts DR4 completes a circuit between leads 230 and 232 and energizes the latching coil 1CR through the lead 233 which incorporates the still closed switch 6CR1. When the relay 1CR is energized the switch 1CR1 is opened and the switch 1CR2 is closed. The rapid return movement of the tool slide continues until a dog shifts the drum switch back to its rapid approach position and another dog simultaneously closes the limit switch 6LS. In its rapid approach position switches DR1, DR2 and DR5 are closed while switches DR3 and DR4 are opened, and the opening of switch DR3 deenergizes coil RRC and drops out contacts RR to stop the rapid motor. However, the cycle will not resume until the front slide is advanced or adjusted for the second depth of cut and coils RAC and 12CR are again energized.

*First front slide adjustment*

With switch 6LS closed and the control relay having the coil 1CR in latched position, the coil FSAC of the front slide advance relay is energized, this circuit extending from lead CS1 through lead 213 to lead 229 and through lead 255 incorporating the closed switches 6LS and 1CR2. Energization of the coil FSAC causes switch FSA1 to open and switch FSA2 to close, and additionally closes contacts FSA to start the front slide motor in its advance direction. The front slide continues to advance until the members 105 on the control mechanism open limit switch 1LS and close limit switch 2LS, this latter action completing a circuit through lead 243 to energize the coil 7CR so that switches 7CR1 and 7CR2 close, while the opening of the limit switch 1LS breaks the lead 240 and causes the coil 6CR to drop out, thereby opening switch 6CR1 in lead 233 so that coil 1CR becomes deenergized.

The front slide motor is then stopped by "plugging" or temporarily connecting the motor to the supply line for reverse rotation by means including the plugging switch 1PS. For safety reasons this plugging switch has the latch coil 1LC which prevents either contact on the plugging switch from closing until the latch coil is energized. When the coil FSAC was energized contacts FSA2 were closed as above noted to energize the latch coil 1LC, thereby closing the plugging switch contacts 1PSa and 1PSc to complete a circuit between the leads 258 and 259 and energize coil FSRC, which closes contacts FSR. When the motor 96 slows down and just prior to reversing, the plugging switch 1PS is designed (as by a centrifugal governor) to open to break contact between leads 258 and 259 and deenergize the coil FSRC, thereby opening contacts FSR and allowing the motor to stop.

*Second rapid approach*

The control release apparatus having operating coils 2CR, 3CR, 4CR and 5CR have been in their released positions so far during the cycle of the machine. The relay coil 9CR is energized and the switch 9CR1 is closed due to the rear slide closing the limit switch 4LS with the result that the normally open switch 9CR1 in the lead 254 is closed. When the front slide has advanced to its second cut position and deenergized the relay coil 1CR and energized the relay coil 7CR, relay coil 11CR is energized, the lead 254 now being completely closed with the switch 1CR1 in its normal closed position and the switch 7CR1 closed due to the energization of the coil 7CR. Consequently switches 11CR1 and 11CR2 are closed. Closing the switch 11CR1 shorts around push button PB1 to energize coil RAC, and closing of switch 11CR2 shorts around push button PB1', energizing coil 12CR so that the tool slides again move through rapid approach and rapid return positions of their cycle in the same manner as previously described.

*Second rapid return*

Since the limit switch 2LS on the front slide is closed to energize the coil 7CR when the drum switch is thrown into its rapid return position wherein switches DR3 and DR4 are closed, the latch coils 2CR and 4CR are energized, the circuit for latch coil 2CR extending from control lead CS1 through lead 213, lead 220, switch CAM, lead 232, switch DR4, lead 230, and lead 234 incorporating the now closed switch 7CR2. The circuit for the latch coil 4CR is partially common with that for the coil 2CR and includes the lead 236 which branches from the lead 234 beyond the switch 7CR2. As a result of the energization of these two coils, switches 2CR2 and 4CR2 are closed and switches 2CR1 and 4CR1 are opened. The opening of the last mentioned switches breaks the circuit to the coil 11CR, the closing of switch 2CR2 completes the circuit through lead 257 to the coil FSAC, and the closing of switch 4CR2 conditions the circuit of the coil RSAC, since the switch 4CR2 is in the lead 261.

*Second front slide adjustment*

When the limit switch 6LS is again closed at the end of the rapid return movement of the front slide, switch 2CR2 energizes coil FSAC to close the front slide motor contacts FSA and cause the front slide to advance towards its third cutting position until the limit switch 3LS on the front slide closes to energize the release coil 2CR' (thus opening contacts 2CR2 and closing contacts 2CR1) and to energize coil 8CR which is in parallel with the release coil 2CR'. Energization of the coil 8CR closes normally open contacts 8CR1 and 8CR2. The motor is stopped by "plugging" as earlier described.

*Rear slide adjustment*

The closing of contacts 7CR2 in lead 234 energized coil 4CR, thereby closing the normally open contacts 4CR2 and energizing the rear slide advance coil RSAC and closing contacts RSA to start the rear slide motor 118. The rear slide advances until it closes limit switch 5LS and thereby energizes coil 10CR and the release coil 4CR' which is in parallel therewith. The motor 118 is stopped by "plugging" through the switch 2PS as earlier described in connection with the switch 1PS and the motor 36.

Third rapid approach

With both slides advanced limit switches 3LS and 5LS are closed to energize coils 8CR and 10CR, release coils 2CR' and 4CR' being in parallel and being energized simultaneously. As a consequence of this action coil 11CR is energized through lead 254 and the parallel lead 254a incorporating the now closed switches 8CR2 and 10CR1. Energization of the coil 11CR closes a circuit around the push button PB1, resulting in energization of the coil RAC with closure of the contacts RA and operation of the rapid motor 62 in advance direction, together with operation of the spindle motor in the same manner as earlier described.

Both slides return

With coil 8CR energized the switch 8CR1 in the lead 230 is closed and coils 3CR and 5CR will latch during the last rapid return. Then when limit switch 6LS is closed the coil FSRC is energized through the closed switch 3CR2 to return the front slide and the coil RSRC is energized through the now closed switch 5CR2 to return the rear slide. When the front slide returns to close limit switch 1LS it energizes the release coil 3CR', opening the switch 3CR2 and dropping out the coil FSRC. In the meanwhile, the plugging switch 1PS has operated in the reverse direction than that earlier described to complete the lead 258 so when the coil FSRC drops out switch FSR1 closes and the motor tends to reverse until it slows down enough to allow the plugging switch to open. This drops out the coil FSAC and the motor stops. The rear slide plug stops the motor 118 in the same manner after closing limit switch 4LS which energizes release coil 5CR'. Opening of the switches in the lead 254 causes the coil 11CR to become deenergized, both of the parallel switches 7CR1 and 8CR2 being open. Consequently, the cycle cannot start again until the cycle start button is again pressed.

Automatic two cut cycle

When it is desired to run the machine through a cycle of only two cuts the cycle switch CYS is closed in its "cycle two" position which eliminates the second position on the front slide. During rapid return after the first cut coils 1CR and 4CR are both latched, being connected in parallel by means of cycle switch when said switch is in its two cut position as shown. The switches associated with the coil 1CR allow the front slide to advance until limit switch 3LS closes the circuit to release coil 1CR', and the switches associated with the coil 4CR advance the rear slide until release coil 4CR' is energized by limit switch 5LS. At this point coil 11CR is energized because of the closure of switches 8CR2 and 10CR1 to resume the cycle. With this exception the sequence of the two cut cycle is exactly the same as with the three cut cycle above described.

Emergency return button

The emergency return button has three sets of contacts PB5, PB5' and PB5", the first two sets being normally closed and the third set being normally open. Upon operation of the push button the contacts PB5 break the circuit to the coil RAC to stop rapid approach, and the contacts PB5' break the circuit to the coil 12CR to disengage the clutch and brake the spindle motor to a stop. When the drum switch is in rapid approach position the switch DR2 is closed and the coil 13CR is energized through the lead 221. In any other position of the switch the relay 13CR is deenergized and the switch 13CR2 is closed. The contacts PB5" act to complete a circuit to energize relay coil 14CR, and the switch 14CR1 causes energization of the coil RRC for rapid return whenever switch 13CR2 is closed, while the switch 14CR2 opens to insure that the coil 11CR is not energized so that the cycle may not start again. With the apparatus in this condition the relay coil 14CR' is energized through the switch 12CR3 at the beginning of the next cycle to unlatch the relay.

If the emergency button is used during rapid approach while switch 13CR2 is open the relay 14CR will not be latched since the lead 224 is open, but the machine will stop. In this case the work can be unclamped and removed and the machine allowed to complete its cycle, or the normally mechanically operated drum switch may be manually placed in rapid return position which will set up the circuits above described.

Jog buttons

The jog approach button PB2, jog return PB6 and jog spindle button PB7 each use two pairs of contacts. One pair of the jog approach button PB2 shorts around the cycle start switch PB1 by means of the lead 216, and the jog return and jog spindle buttons break the circuit to the coil 12CR to stop the spindle. The other pair of contacts on the jog return button PB6 complete a circuit around the switch 14CR1 to energize the coil RRC; and the other pair PB7' on the jog spindle button PB7 complete a circuit for direct energization of the coil 12RC.

Cycle auto-manual switch

When the cycle automanual switch CAM is in the manual or open position the circuit to the coil 11CR is open and consequently the rapid approach motor cannot be energized. With the button in this position after the tools advance each cut must be started by pressing the cycle start button PB1 since there is no holding circuit around this button, the switch 11CR1 being open.

We claim:

1. In a lathe having a rotatable work supporting spindle, a front carriage reciprocable longitudinally of the spindle axis, a front tool-carrying cross slide adjustable transversely on the front carriage, means for reciprocating the front carriage and means for actuating the cross slide during movement of the carriage comprising a cam bar extending longitudinally of the carriage and stationary with respect thereto and having a slot with a portion parallel to the spindle axis and a connecting portion extending diagonally outwardly therefrom, a bar member adjustably supported on said cross slide for movement transversely of the spindle axis and carrying a follower operable in said cam slot, and means for adjusting said bar member on said cross slide comprising a reversible electric motor supported on the cross slide and connecting means including a screw and nut device intermediate said motor and bar member, means including a switch carried on the cross slide operable upon the completion of a cutting cycle to energize said motor to adjust said bar member slide with respect to said cross slide to effect a deeper cut of the tools during a second cutting cycle, means operable upon completion of a second cutting cycle to energize said motor to adjust the bar member again to effect a still deeper cut of the tools during a third cutting cycle, means including a third switch operable upon completion of said third cutting cycle to return the bar member and cross slide to their original relative position, and braking means for said motors to insure accurate adjusting of said cross slides upon the respective carriages, said braking means comprising means for disconnecting said motors and for simultaneously temporarily reversely connecting said motors, and for breaking the reverse connections before reverse operation of the motors occurs.

2. In a lathe having a rotatable work supporting spindle, a front carriage reciprocable longitudinally of the spindle axis, a front tool-carrying cross slide adjustable transversely on the front carriage, means for reciprocating the front carriage and means for actuating the cross slide during movement of the carriage comprising a cam bar extending longitudinally of the carriage and stationary with respect thereto and having a slot with a portion parallel to the spindle axis and a connecting portion extending diagonally outwardly therefrom, a bar member adjustably supported on said cross slide for movement transversely of the spindle axis and carrying a follower operable in said cam slot, and means for adjusting said bar member on said cross slide comprising a reversible electric motor supported on the cross slide and connecting means including a screw and nut device intermediate said motor and bar member, means including a switch carried on the cross slide operable upon the completion of a cutting cycle to energize said motor to adjust said bar member with respect to said cross slide to effect a deeper cut of the tools during a second cutting cycle, means operable upon completion of a second cutting cycle to energize said motor to adjust the bar member again to effect a still deeper cut of the tools during a third cutting cycle, and means including a third switch operable upon completion of said third cutting cycle to return the bar member and cross slide to their original relative position.

3. In a lathe having a rotatable work supporting spindle, a carriage reciprocable longitudinally of the spindle axis, a tool-carrying cross slide adjustable transversely on the carriage, means for reciprocating the carriage and means for actuating the cross slide during movement of the carriage comprising a cam bar extending longitudinally of the carriage and stationary with respect thereto and having a slot with a portion parallel to the spindle axis and a connecting portion extending diagonally outwardly therefrom, a bar member adjustably supported on said cross slide for movement transversely of the spindle axis and carrying a follower operable in said cam slot, and means for adjusting said bar member on said cross slide comprising a reversible electric motor supported on the cross slide and connecting means including a screw and nut device intermediate said motor and bar member, means including a switch carried on the cross slide operable upon the completion of a cutting cycle to energize said motor to adjust said bar member with respect to said cross slide to effect a deeper cut of the tools during a second cutting cycle, means operable upon completion of a second cutting cycle to energize said motor to adjust the bar member again to effect a still deeper cut of the tools during a third cutting cycle, and means including a third switch operable upon completion of said third cutting cycle to return the bar member and cross slide to their original relative position, and control means including a circuit having a switch movable between two positions, said circuit controlling the operation of said lathe to omit one of said adjusting operations and cutting cycles when the switch is in one position.

4. In a lathe having a rotatable work supporting spindle, a front carriage reciprocable longitudinally of the spindle axis, a front tool-carrying cross slide adjustable transversely on the front carriage, means for reciprocating the front carriage and means for actuating the cross slide during movement of the carriage comprising a cam bar extending longitudinally of the carriage and stationary with respect thereto and having a slot with a portion parallel to the spindle axis and a connecting portion extending at an angle therefrom, a bar member adjustably supported on said cross slide for movement transversely of the spindle axis and carrying a follower operable in said cam slot, and means for adjusting said bar member on said cross slide comprising a reversible electric motor supported on the cross slide and connecting means including a screw and nut device intermediate said motor and bar member, means operable upon the completion of a cutting cycle to energize said motor to adjust said bar member with respect to said cross slide to effect a deeper cut of the tools during a second cutting cycle, means operable upon completion of a second cutting cycle to energize said motor to adjust the bar member again to effect a still deeper cut of the tools during a third cutting cycle, and means operable upon the completion of said third cutting cycle to return the bar member and cross slide to their original relative position.

5. In a lathe having a rotatable work supporting spindle, a front carriage reciprocable longitudinally of the spindle axis, a front tool-carrying cross slide adjustable transversely on the carriage, mechanism for actuating said carriage and cross slide through a cycle wherein a tool on the cross slide is moved from a withdrawn position towards the spindle axis to a cutting depth and thereafter is moved longitudinally of the spindle axis to perform a turning operation and is then returned to said withdrawn position, means operable after a turning operation to adjust the cross slide transversely of the spindle axis to cause the tool to take a deeper cut during another cycle of operation comprising a motor carried on the cross slide, a bar member slidable relative to the cross slide transversely of the spindle axis, a cam follower on said bar member operable on a stationary cam extending longitudinally of the carriage and gearing intermediate said motor and bar member for adjusting the relative position of the bar and the cross slide, and means for controlling said motor comprising a plurality of switch devices carried on said cross slide, a rotatably mounted switch actuating member, and a rack and pinion device between said switch actuating member and bar member.

6. In a lathe having a rotatable work supporting spindle, a front carriage reciprocable longitudinally of the spindle axis, a front tool-carrying cross slide adjustable transversely on the carriage, mechanism for actuating said carriage and cross slide through a plurality of cycles wherein a tool on the cross slide is moved from a withdrawn position towards the spindle axis to a cutting depth and thereafter is moved longitudinally of the spindle axis to perform a turning operation and is then returned to said withdrawn position, means operable after a turning operation to adjust the cross slide transversely of the spindle axis to cause the tool to take a deeper cut during another cycle of operation comprising a motor carried on the cross slide, a bar slidable relative to the cross slide transversely of the spindle axis and gearing intermediate said motor and bar for adjusting the relative position of the bar and the cross slide, a plurality of switches on said cross slide for controlling the operation of said motor, and a switch actuating member rotatable upon relative movement of said bar and cross slide for operating said switches.

7. In a lathe having a rotatable work supporting spindle, a carriage reciprocable longitudinally of the spindle axis, a tool-carrying cross slide adjustable transversely on the carriage, means for reciprocating the carriage and means for actuating the cross slide during movement of the carriage comprising a cam member extending longitudinally of the carriage and stationary with respect thereto and having a slot with a portion parallel to the spindle axis and a connecting portion extending diagonally outwardly therefrom, a bar member adjustably supported on said cross slide for movement transversely of the spindle axis and carrying a follower operable in said cam slot, and means for adjusting said bar member on said cross slide comprising reversible motor means supported on the cross slide and connecting means intermediate said motor and bar, means carried on the cross slide operable upon the completion of a cutting cycle to energize said motor to adjust said bar member with respect to said cross slide to effect a deeper cut of the tools during a second cutting cycle, means operable upon completion of a second cutting cycle to energize said motor to adjust the bar member again to effect a still deeper cut of the tools during a third cutting cycle, and means operable upon the completion of said third cutting cycle to return the bar member and cross slide to their original relative position.

8. In a lathe having a rotatable work supporting spindle, a carriage reciprocable longitudinally of the spindle axis, a tool-carrying cross slide adjustable transversely on the carriage means for reciprocating the carriage and means for actuating the cross slide during movement of the carriage comprising a cam member having a portion parallel to the spindle axis and a connecting portion extending at an angle therefrom, a bar member adjustably supported on said cross slide for movement transversely of the spindle axis and carrying a follower cooperating with said cam, and means for adjusting said bar member on said cross slide comprising a reversible electric motor supported on the cross slide and connecting means including a screw and nut device intermediate said motor and bar member, means operable upon the completion of a cutting cycle to energize said motor to adjust said bar member with respect to said cross slide to effect a deeper cut of the tools during a second cutting cycle, means operable upon completion of a second cutting cycle to energize said motor to adjust the bar member again to effect a still deeper cut of the tools during a third cutting cycle, means operable upon the completion of said third cutting cycle to return the bar member and cross slide to their original relative position, and control means including a circuit having a switch movable between two positions, said circuit controlling the operation of said machine to omit said second cutting cycle when the switch is in one position.

9. In a lathe having a rotatable work supporting spindle, a carriage reciprocable longitudinally of the spindle axis, a tool-carrying cross slide adjustable transversely on the carriage, means for reciprocating the carriage and means for actuating the cross slide during movement of the carriage comprising a cam member having a portion parallel to the spindle axis and a connecting portion extending at an angle therefrom, a bar member adjustably supported on said cross slide for movement transversely of the spindle axis and carrying a follower cooperating with said cam, and means for adjusting said bar member on said cross slide comprising a reversible motor on said cross slide and connecting means intermediate said motor and bar member, means operable upon the completion of a cutting cycle to energize said motor to adjust said bar member with respect to said cross slide to effect a deeper cut of the tools during a second cutting cycle, means operable upon completion of a second cutting cycle to energize said motor to adjust the bar member again to effect a still deeper cut of the tools during a third cutting cycle, and means operable upon the completion of said third cutting cycle to return the bar member and cross slide to their original relative position.

10. In a lathe having a rotatable work supporting spindle, a front carriage reciprocable longitudinally of the spindle axis, a front tool-carrying cross slide adjustable transversely on the carriage, mechanism for actuating said carriage and cross slide through a cycle wherein a tool on the cross slide is moved from a withdrawn position towards the spindle axis to a cutting depth and thereafter is moved longitudinally of the spindle axis to perform a turning operation and is then returned to said withdrawn position, means operable after a turning operation to adjust the cross slide transversely of the spindle axis to cause the tool to take a deeper cut during another cycle of operation comprising a motor carried on the cross slide, a member slidable relative to the cross slide tranversely of the spindle axis and forming a part of said actuating mechanism and operable to move the cross slide to cutting depth and connecting means intermediate said motor and member for adjusting the relative position of the member and the cross slide, and means for controlling said motor comprising a plurality of switches carried on said cross slide and operable upon relative movement of said member and cross slide.

11. In a lathe having a work supporting spindle rotatable about an axis, a carriage reciprocable longitudinally of said axis, a tool-carrying cross slide adjustable on the carriage transversely of said axis, means for moving said carriage and cross slide longitudinally of the spindle axis to cause a tool on the cross slide to perform a turning operation and for returning said carriage and cross slide to complete a cutting cycle, a bar member adjustably supported on said cross slide for movement transversely of the spindle axis, and means for adjusting said bar member on said cross slide comprising a motor supported on the cross slide and gearing including a screw and nut device intermediate said motor and bar member, means operable upon the completion of a cutting cycle to energize said motor to adjust said bar member with respect to said cross slide to effect a deeper cut of the tools during a second cutting cycle, means operable upon completion of a second cutting cycle to energize said motor to adjust the bar member again to effect a still deeper cut of the tools during a third cutting cycle, and means operable upon the completion of said third cutting cycle to return the bar member and cross slide to their original relative position.

12. In a machine tool having a work supporting spindle rotatable about an axis, a carriage reciprocable longitudinally of said axis, a tool-carrying cross slide adjustable on the carriage transversely of said axis, means for moving said carriage and cross slide longitudinally of the spindle axis to cause a tool on the cross slide to perform a turning operation and for returning said carriage and cross slide to complete a cutting cycle, means for adjusting said cross slide transversely on said carriage comprising reversible motor means, means operable upon the completion of a cutting cycle to energize said motor to adjust said cross slide to effect a deeper cut of the tools during a second cutting cycle, means operable upon completion of a second cutting cycle to energize said motor to adjust said cross slide again to effect a still deeper cut of the tools during a third cutting cycle, means operable upon the completion of said third cutting cycle to return the cross slide to its original position, and control means including switch means for controlling the operation of said machine selectively to omit said second cutting cycle.

13. In a machine tool having a work supporting spindle rotatable about an axis, a carriage adjustable longitudinally of said axis, a tool-carrying cross slide on the carriage movable transversely of said axis, means for actuating said carriage and cross slide through a cycle wherein a tool on the cross slide is moved longitudinally of the spindle axis to perform a turning operation, means operable after a turning operation to adjust the cross slide transversely of the spindle axis to cause the tool to take a deeper cut during another cycle of operation comprising motor means on the cross slide, a bar movable relative to the cross slide transversely of the spindle axis and connecting means including gearing and a screw and nut device intermediate said motor means and bar for adjusting the position of the bar on the cross slide, means for controlling said motor means comprising a plurality of control members carried on said cross slide and operable upon relative movement of said bar and cross slide, and control means including switch means for controlling the operation of said actuating means through a selected predetermined number of cycles.

14. In a lathe having a work supporting spindle rotatable about an axis, a carriage reciprocable longitudinally of said axis, a tool-carrying cross slide on the carriage adjustable transversely of said axis, means for actuating said carriage and cross slide through a cycle wherein a tool on the cross slide is moved longitudinally of the spindle axis to perform a turning operation and is then returned, means operable after a turning operation to adjust the cross slide transversely of the spindle axis to cause the tool to take a deeper cut during another cycle of operation comprising reversible motor means on the cross slide, a bar slidable relative to the cross slide transversely of the spindle axis and connecting gearing intermediate said motor and bar for adjusting the position of the bar on the cross slide, and means for controlling said motor comprising a plurality of control members carried on said cross slide and at least one actuating member operable on said control members in response to relative movement of said bar and cross slide.

15. In a machine tool having a work supporting spindle rotatable about an axis, a carriage movable longitudinally of said axis, a tool-carrying cross slide adjustable on the carriage transversely of said axis, means for actuating said carriage and cross slide through a cycle wherein a tool on the cross slide is moved longitudinally of the spindle axis to perform a turning operation, and means operable after a turning operation to adjust the cross slide transversely of the spindle axis to cause the tool to take a deeper cut during another cycle of operation comprising motor means on the cross slide, a bar movable relative to the cross slide transversely of the spindle axis and connecting means including gearing and a screw device intermediate said motor means and bar for adjusting the position of the bar on the cross slide, and means for controlling said motor means comprising a plurality of control members carried on said cross slide and operable upon relative movement of said bar and cross slide.

TIMOTHY B. BUELL.
HARRY R. LEBER.

REFERENCES CITED

The following references are of record in the file of this patent:

UNITED STATES PATENTS

| Number | Name | Date |
|---|---|---|
| 1,367,459 | Carson | Feb. 1, 1921 |
| 2,002,933 | Buell | May 28, 1935 |
| 2,105,744 | Le Tourneau | Jan. 18, 1938 |
| 2,134,024 | Bogart | Oct. 25, 1938 |
| 2,144,735 | Granberg | Jan. 24, 1939 |
| 2,172,999 | Hoelscher | Sept. 12, 1939 |
| 2,351,649 | Wintermute | June 20, 1944 |
| 2,389,368 | King | Nov. 20, 1945 |
| 2,450,096 | Siekmann | Sept. 28, 1948 |